United States Patent [19]

Stage et al.

[11] Patent Number: 4,563,018
[45] Date of Patent: Jan. 7, 1986

[54] TOWING DEVICE

[76] Inventors: Edward C. Stage, P.O. Box 1133; Gerald E. Rister, 1880 #E. Linda Ave., both of Marysville, Calif. 95901

[21] Appl. No.: 539,990
[22] Filed: Oct. 7, 1983
[51] Int. Cl.$^4$ .............................................. B60P 3/06
[52] U.S. Cl. ................... 280/402; 212/238; 414/563; 280/491 R
[58] Field of Search ........... 280/402, 511, 513, 491 R, 280/491 B, 498; 414/563; 212/238; 254/124

[56] References Cited

U.S. PATENT DOCUMENTS 3,679,243  7/1972  Hamerl .................................. 280/511
3,871,535  3/1975  Fenske ................................... 414/563

Primary Examiner—David M. Mitchell
Assistant Examiner—Richard Camby
Attorney, Agent, or Firm—Leonard Bloom

[57] ABSTRACT

A vehicular towing device comprised of an elevation arm having a socket on one end and pivotably mounted to a mounting bracket on an opposed end interposed there between an hydraulic cylinder along with associated support cylinders so that the socket on the end of the elevation arm may rotationally receive therein the ball installed on a towed vehicle, the hydraulic cylinder co-acting with the elevation arm to elevate the front end of the towed vehicle off the ground surface so that the towed vehicle may be towed with only the rear wheels in contact with the ground surface.

5 Claims, 5 Drawing Figures

TOWING DEVICE

BACKGROUND OF THE INVENTION

The instant application refers generally to a towing device for vehicles, and more specifically to a towing device affixed to the rear bumper of a vehicle which engages and lifts the front of the towed vehicle off the ground in order to tow same in a more secure fashion.

In the past, vehicle towing devices have usually comprised a mechanical linkage fastening the rear bumper of the towing vehicle to the front bumper of the towed vehicle so that the towed vehicle trails with all four wheels in contact with the ground. Although this provides an adequate method for towing a vehicle, there are numerous disadvantages attendant with the use of this type of apparatus. The towed vehicle has a tendency to wander from side to side slightly while being towed thus imparting lateral forces to the rear wheels of the towing vehicle which may result in an unsteady and meandering path that could lead to jackknifing or skidding of the towing vehicle. Furthermore, the front wheels of the towed vehicle experience excessive wear as the towed vehicle makes slight directional changes as it trails. A further disadvantage lies in the fact that when all four wheels of the towed vehicle are in contact with the ground surface it is often necessary to disconnect the power steering unit associated with the front wheels of the towed vehicle and/or the drive train in order to prevent mechanical damage to these mechanisms. Therefore, there are numerous disadvantages associated with the use of conventional towing devices in which the towed vehicle has all four wheels on the ground surface and essentially trails the towing vehicle.

These and other disadvantages are overcome by the device according to the instant disclosure which provides a means to lift one end of the towed vehicle off the ground so that the vehicle is towed with only the rear or front wheels in contact with the ground surface, whereby providing greater tracking stability and less wear and tear on the towed vehicle.

The following citations comprise the prior art of which applicant is aware that would appear to be germane to the patent process:

2,078,851 S. D. Hovey,
2,314,870 M. E. Dayton,
3,679,243 Hamerl,
3,796,443 Crutchfield,
4,073,506 Pressley, The patent to Pressley is of interest since he teaches the use of a towing device whereby the front portion of the towed vehicle is raised above the ground surface thereby towing the towed vehicle with only the rear wheels in contact with the ground. However, Pressley does not provide a means to elevate the towed vehicle into a towing position. Furthermore, the device according to Pressley has a preset elevation level determined by its structure. The device according to the instant application is easily distinguished in that it provides a hydraulic unit to variably elevate the towed vehicle into a towing position. Furthermore, the instant device provides a means to tow various types of vehicles such as cars, trucks, and motorcycles, and further provides a storage position for the device when not in use.

The remaining citations delineate the state of the art further, however, none of the citations would appear to anticipate nor render obvious that which is disclosed herein.

SUMMARY AND OBJECTS OF THE INVENTION

Accordingly, it is a primary object of the present invention to provide a vehicular towing device which elevates the front or rear end of the towed vehicle to a desired position with its front or rear wheels off the ground surface so that only one pair of wheels of the towed vehicle are in contact with the ground surface, thereby greatly improving the tracking characteristics of the towed vehicle which greatly reduces the safety problems associated with the lateral directional tracking phenomena associated with the use of conventional vehicle towing apparatus.

It is another object of the present invention to provide a vehicular towing device which greatly reduces the wear and tear on the front or rear wheels of the towed vehicle by elevating same off the ground surface.

It is a further object of the present invention to provide a vehicular towing device which is adaptable to tow various types of vehicles such as cars, trucks, and motorcycles without having to make major structural modifications to the towed vehicle.

It is a still further object of the present invention to provide a vehicular towing device which mounts in a stored, unobtrusive position when not in use so that the device may be permanently mounted to the rear bumper of the towing vehicle.

It is yet another object of the present invention to provide a vehicular towing device which has an hydraulic elevation means associated with the towing arm so that the towed vehicle may be elevated to the towing position easily even by those of lesser strength, such as children or the elderly.

It is still a further object of the present invention to provide a vehicular towing device which is easy to manufacture and lends itself well to mass production techniques.

It is still another object of the present invention to provide a vehicular towing device which allows the towing vehicle to easily negotiate a 180° turn.

It is yet a further object of the present invention to provide a vehicular towing device which can tow a vehicle having a conventional trailer hitch with a ball by reversing the ball, locking the steering of the towed vehicle, lifting the rear end of the towed vehicle and towing same backwards using the instant device.

These and other objects are accomplished by the provision of a vehicular towing device having a hydraulically elevated towing arm associated with mounting members attached to the rear bumper of the towing vehicle, the elevation arm having on one end a socket in which is received a towing ball which is affixed to the appropriate frame member of the towed vehicle so that when the ball is engaged in the socket the elevation arm can be elevated thereby raising the front or rear wheels of the towed vehicle off the ground surface so that the towed vehicle may be towed behind the towing vehicle with only the one set of wheels of the towed vehicle in contact with the ground surface.

DESCRIPTION OF THE PREFERRED EMBODIMENT

Figure 1:
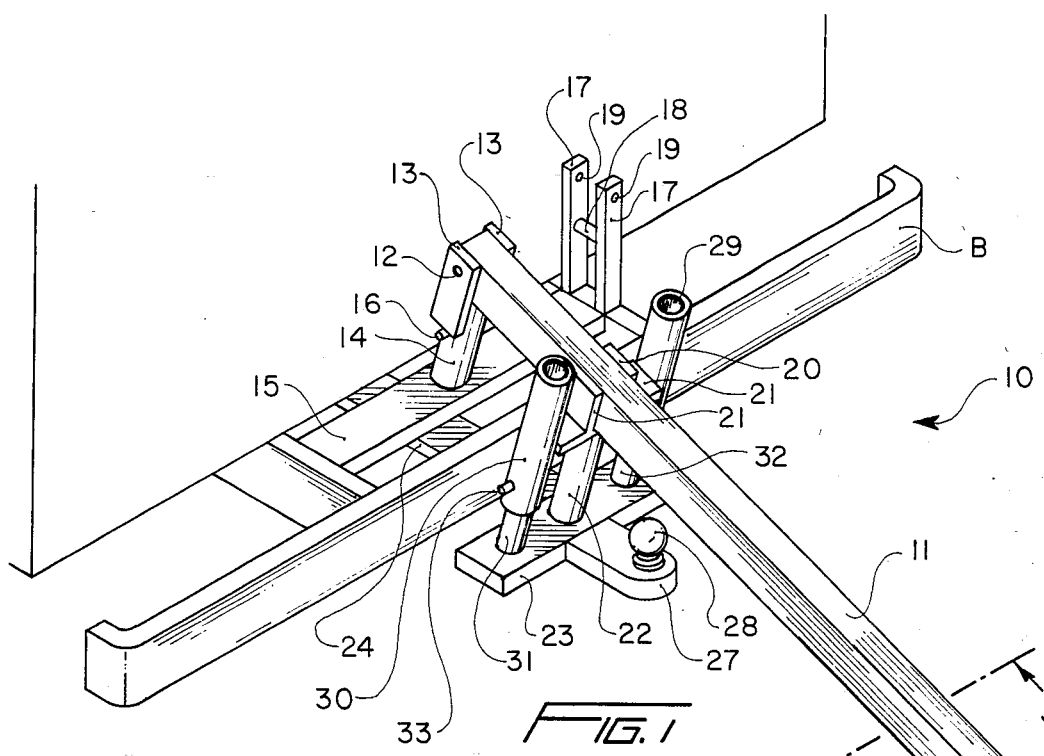
FIG. 1 is a perspective view of the device according to the instant application as it would appear mounted upon the rear bumper of a towing vehicle.

Referring now to the drawings in detail wherein like reference numerals represents like parts throughout the several figures, reference numeral 10 refers generally to the instant device which has a pivotally mounted elevation arm 11 which is mounted on one end by an axle 12, the axle being supported by two support members 13 which are mounted upon the top portion of a collar member 14 constituting a support column. The collar 14 overrides and swivels about an inner support tube (not shown) which is affixed to a base plate 15 and provides the structural support for the end of the elevation arm associated therewith. The collar 14 is further provided with a lock pin 16 which co-acts with the inner support column to lock the elevation arm thereby preventing lateral motion of same. When the lock pin is removed the elevation arm may be rotated laterally to a position substantially parallel to the rear bumper B of the towing vehicle where the arm may rest in a stored position provided by the storage support arms 17 having there between a support pin 18 upon which the elevation arm rests when in its stored position. The storage support arms are further provided with a pair of apertures 19 so that a safety pin may pass therethrough to lock the elevation arm in a stored position.

Figure 3:
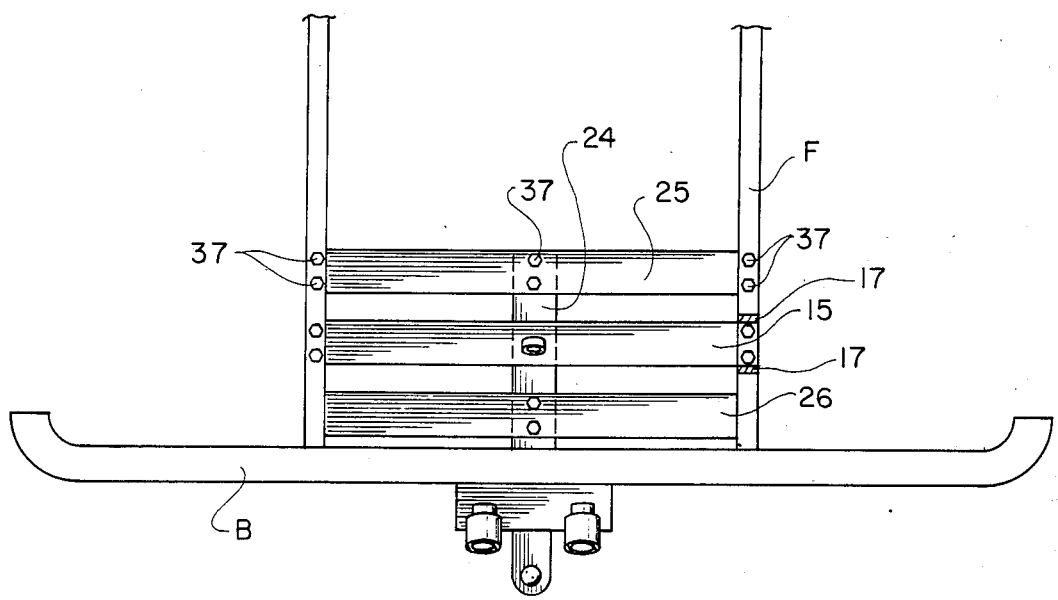
FIG. 3 is a top view of the instant device showing the mounting members which are affixed to the frame of the towing vehicle.

When in an operative position, the elevation arm 11 rides in a channel defined by two upwardly extending walls 20 fixed to a hydraulic base plate 21 which is operatively engaged upon a hydraulic cylinder 22 which may be activated either mechanically or electrically. The hydraulic cylinder 22 is mounted upon a base plate 23 which is supported on a mounting bracket member 24 which is secured beneath and to mounting bracket cross members 15, 25, and 26, which bolt to the frame F of the towing vehicle as best shown in FIG. 3. The base plate 23 is provided with a tang 27 which supports a conventional ball hitch 28 to provide a conventional means of towing a trailer. The hydraulic base plate 21 has affixed at opposed ends thereof two support cylinders 29 and 30 which override and co-act with two support shafts 31 and 32 so that when the towed vehicles is elevated to the desired height by hydraulic cylinder 22 then lock pins 33 engage bores provided in the support shafts 31 and 32 so that the elevation arm 11 may be held in an elevated position mechanically so that the hydraulic pressure within the hydraulic cylinder 22 can be relieved and the towed vehicle can remain in the elevated position.

Figure 2:
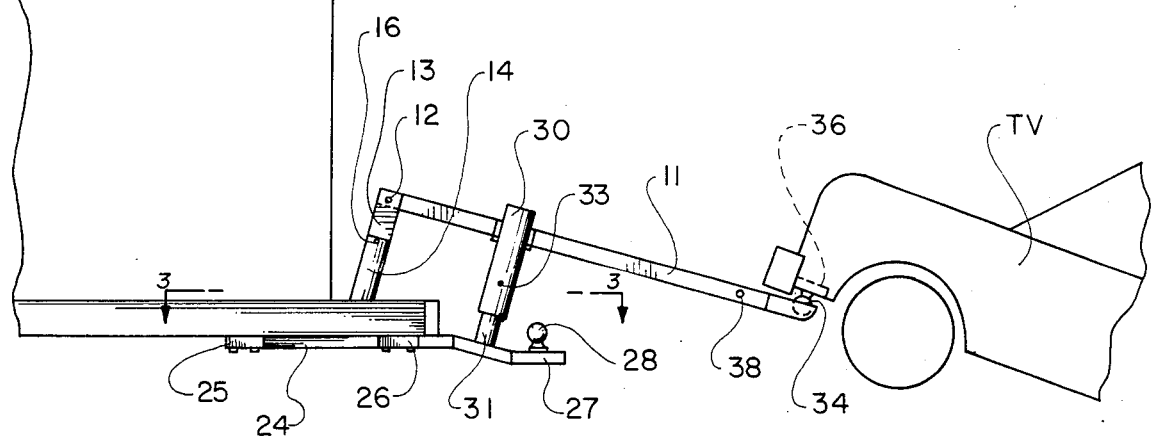
FIG. 2 is a side view of that which is shown in FIG. 1 further providing a view of a towed vehicle in an elevated towing position.

As shown in FIG. 2, the elevation arm 11 is provided on a forward end thereof with a socket 34 to receive a ball 35 which is directed downwardly from a mounting bracket 36 which is affixed to a forward portion of the bumper support arms or the frame of the towed vehicle TV. The ball 35 is positively engaged within the confines of the socket 34 so that the towed vehicle remains securely engaged to the elevation arm 11. The mounting bracket 36 along with the associated mounting ball is mounted in a centrally disposed position equidistant between the front wheels of the towed vehicle to properly balance and trail the towed vehicle. In FIG. 2 the towed vehicle is shown in the elevated position after the hydraulic cylinder has elevated the elevation arm 11 thereby lifting the front wheels of the towed vehicles off the ground surface. In a further embodiment the elevation arm 11 may be raised by a mechanical crank winch or a winch in combination with an electrical motor. It should be noted that the elevation arm 11 can be formed from telescoping members if so desired to facilitate storage and operation of the device.

The base plate 23 is angulated slightly downward as shown in FIG. 2, which similarly angulates the hydraulic cylinder 22 and the associated support cylinders 29 and 30 to better support the elevation arm 11 when the vehicle is in elevated position by providing a substantially right angle between the support cylinders 29 and 30 and the elevation arm 11.

As shown in FIG. 3, the members of the mounting brackets 25, 15, and 26 are bolted to the frame F by a series of bolt fasteners 37. This arrangement provides a support web of substantial enough strength to support the loads experienced by the elevation arm 11.

Figure 4:
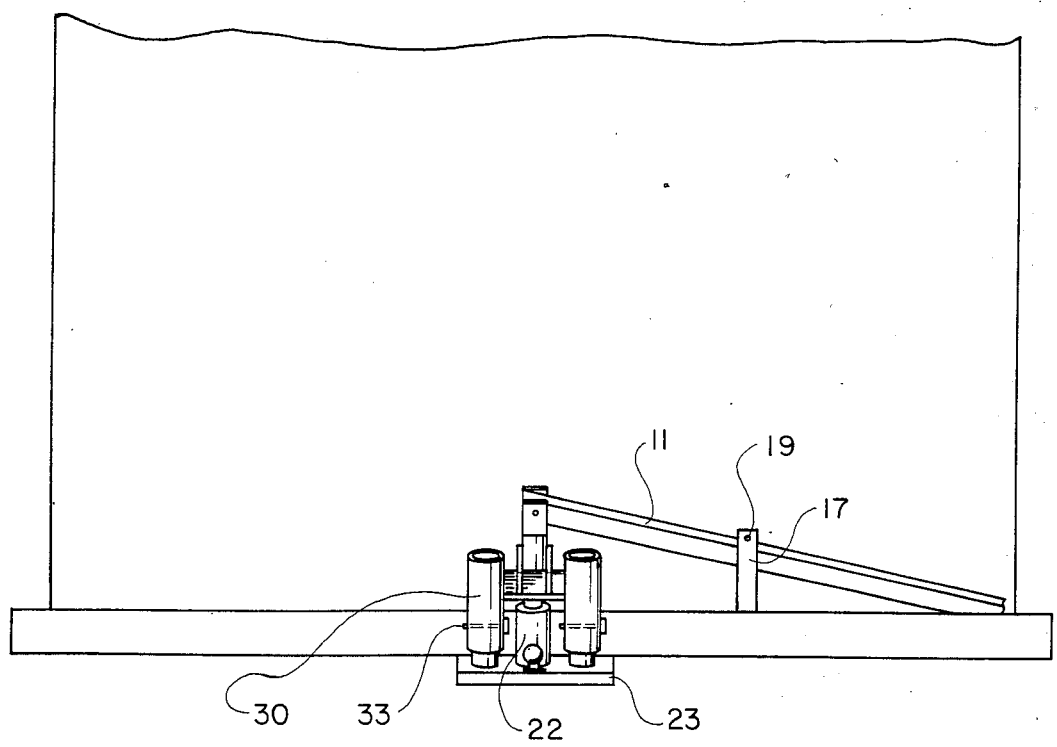
FIG. 4 is a front view of the instant device showing the elevation arm in its stored position.

In use and operation, the elevation arm 11 is released from the support members 13 and withdrawn from the stored position, best shown in FIG. 4, and rotated into place in the channel defined by the base plate walls 20 so that the socket 34 directly underlies the ball 35 associated with the towed vehicle. Thereafter, the hydraulic cylinder 22 is actuated either mechanically or electrically which raises the hydraulic base plate 21 thereby elevating the elevation arm 11 to a point where the socket 34 engages the ball 35 thereafter lifting the towed vehicle off the ground surface so that the front wheels are completely elevated. When the towed vehicle is elevated to the desired position the lock pins 33 are placed in active engagement with the support shafts 31 and 32 so that the hydraulic pressure within the hydraulic cylinder 22 can be relieved and the towed vehicle can remain in the elevated position. Once elevated and properly secured, the towed vehicle may be trailed behind the towing vehicle with the ball 35 and socket 34 co-acting to form a universal swivel joint so that both the towing and towed vehicles may negotiate various types of terrain which may be encountered. In a further embodiment, a forward portion of the elevation arm 11 is provided with a horizontal bore 38 therethrough which may be used in conjunction with a motorcycle front end after the front wheel is removed to hold same in a secure relationship with the elevation arms so that the device 10 may be used to tow a motorcycle or the like. In this mode the swivel aspect of the front end of the motorcycle provides the universal joint necessary in towing a vehicle. It is also contemplated to provide a rack (not shown) to cradle the front and rear wheels of a motorcycle to lift and carry same without touching the ground.

Figure 5:
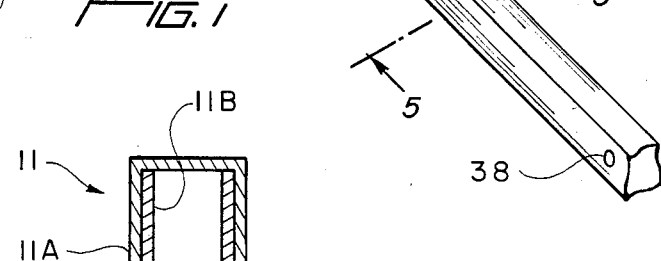
FIG. 5 is a section view, taken across the lines 5—5 of FIG. 1, and showing the elevation arm formed of two telescoping channel members.

As shown in FIG. 5, the elevation arm 11 may be formed of two telescoping channel members 11A and 11B. This allows the elevation arm to be adjusted in length to adapt to various towed vehicles.

It should be noted further that numerous structural modifications and changes may be resorted to without departing from the spirit of the invention.

What I claim is:

1. A vehicular towing device, comprising in combination:
   a framework fastened to a rear portion of the frame of a towing vehicle proximate to the rear bumper,
   an elongate, pivotally mounted elevation arm supported on one end by said framework,
   said elevation arm having on an opposed end thereof an upwardly disposed socket adapted to receive therein a ball operatively associated with a towed vehicle, and
   elevation means supported on said framework proximate said elevation arm and adapted to engage said elevation arm and raise and support same,
   whereby a towed vehicle is engaged by said elevation arm and lifted above the ground surface so that one set of wheels is disengaged from contact with the ground so that the towed vehicle is trailered in an elevated position to improve tracking and reduce wear on the towed vehicle; and
   wherein said framework further comprises,
   a series of cross members bolted to the underside of a pair of longitudinally disposed vehicle frame members,
   one said cross member forming a base plate having upwardly extending supply column to pivotally support one end of said elevation arm,
   a bracket member normal to said cross members and bolted thereto extending rearwardly therefrom beneath and behind the rear bumper of the towing vehicle,
   a second base plate supported on a rear end of said bracket member upon which said elevation means is mounted and supported, and
   a tang member extending rearwardly from said second base plate having mounted thereon a ball to tow a vehicle with all ground engaging wheels of the towed vehicle in contact with the ground.

2. A vehicular towing device, comprising in combination:
   a framework fastened to a rear portion of the frame of a towing vehicle proximate to the rear bumper,
   an elongate, pivotally mounted elevation arm supported on one end by said framework,
   said elevation arm having on an opposed end thereof an upwardly disposed socket adapted to receive therein a ball operatively associated with a towed vehicle, and
   elevation means supported on said framework proximate said elevation arm and adapted to engage said elevation arm and raise and support same,
   whereby a towed vehicle is engaged by said elevation arm and lifted above the ground surface so that one set of wheels is disengaged from contact with the ground so that the towed vehicle is trailered in an elevated position to improve tracking and reduce wear on the towed vehicle; and
   wherein said framework has a support column, and wherein said elevation arm further comprises,
   an elongate channel supported on one end by a horizontally disposed axle fastened to the upper end of said support column, so that said elevation arm can pivot in a vertical plane.
   said support column having an outer cylinder overlying a fixed inner cylinder so that said elevation arm can rotate on a horizontal plane from an operative position to a storage position substantially parallel to the rear bumper of the towing vehicle, and
   a socket on an opposed end of said elevation arm,
   said socket directed upwardly to receive a downwardly directed ball affixed to the towed vehicle.

3. The device of claim 2 wherein said elevation arm further comprises, a telescoping body formed from at least two channel members so that said elevation arm may be adjusted in length to adapt to various towed vehicles.

4. The device of claim 3 further comprising, a storage rack defined by two spaced apart bars upwardly extending from an end of said base plate and a horizontal bar affixed therebetween, whereby said elevation arm can rest in said storage rack when not in use.

5. A vehicular towing device, comprising in combination:
   a framework fastened to a rear portion of the frame of a towing vehicle proximate to the rear bumper,
   an elongate, pivotally mounted elevation arm supported on one end by said framework,
   said elevation arm having on an opposed end thereof an upwardly disposed socket adapted to receive therein a ball operatively associated with a towed vehicle, and
   elevation means supported on said framework proximate said elevation arm and adapted to engage said elevation arm and raise and support same,
   whereby a towed vehicle is engaged by said elevation arm and lifted above the ground surface so that one set of wheels is disengaged from contact with the ground so that the towed vehicle is trailered in an elevated position to improve tracking and reduce wear on the towed vehicle; and
   wherein a second base plate is mounted on the framework, and wherein said elevation means further comprises,
   a hydraulic cylinder jack mounted upon said second base plate beneath said elevation arm,
   a support channel affixed to said hydraulic cylinder defined by a plate having upwardly extending side walls to engage and confine said elevation arm therein,
   two support cylinders affixed to opposed ends of said support channel, said cylinders overriding two cylindrical support columns mounted on opposed ends of said second base plate, and
   movable lock pins associated with openings provided in said support cylinders and support columns to mechanically lock said support channel in a fixed position,
   whereby said elevation arm and a towed vehicle associated therewith can be raised or lowered by said elevation means and locked at a desired height by engaging said lock pins in said support columns and cylinders.

* * * * *